Patented Mar. 14, 1950

2,500,208

UNITED STATES PATENT OFFICE 2,500,208

HIGH COKING BINDER COMPOSITIONS AND PRODUCTS THEREOF

Frederick L. Shea, Jr., Chicago, and Leslie H. Juel, Morton Grove, Ill., assignors to Great Lakes Carbon Corporation, Morton Grove, Ill., a corporation of Delaware No Drawing. Application July 5, 1946, Serial No. 681,594

13 Claims. (Cl. 106—284)

This invention relates to the production of articles and structures comprising carbon which have improved properties and, particularly, to the production of electrodes having increased density, strength and electrical conductivity.

More specifically, our invention relates to obtaining the foregoing properties by combining pitch materials with certain potentially reactive blending agents having the property of increasing the coking propensity of the pitch-blending agent composite and improving the working properties thereof for mixing with divided carbonaceous materials in the production of carbon electrodes and other carbon articles.

The general practice in making carbon articles has been to mix divided carbon materials, such as calcined coke, graphite, electrode carbon scrap or the like, and sometimes including also relatively small proportions of non-carbon solids for specific purposes, with a sufficient amount of a pitch melting below about 125° C. and containing less than about 35% benzol insoluble material. The mixing is usually done above the melting point of the pitch to secure adequate distribution thereof with the divided solids. Small amounts of black oil to serve as a lubricant, especially for extrusion molding of the mixture, is sometimes added in shortly before the mixing is completed. The mixture is cooled and then compressed or extruded in the desired shape, baked to carbonize the pitch binder and frequently heated at a still higher temperature to graphitize the carbon and binder residues therein.

The mechanical and electrical properties of carbon articles so produced and hence their performance in use are limited to a considerable extent by the amount of carbonized pitch binder residue therein, usually not exceeding at most about 50-60% by weight of the pitch, which forms a matrix considerably more porous than the divided carbon solids bonded by it. The insufficiency of carbonized residue from the usual binders and its relatively high porosity in baked carbon articles allow only a nominal approach to the theoretically possible maximum apparent density, strength or hardness and minimum electrical resistance, etc., of the carbon articles.

In one specific embodiment, our invention relates to the combination of conventional pitch binders with potentially reactive blending agents so as to increase substantially the coking propensity of the pitch-blending agent composite beyond that of a mere additive effect of the pitch plus the blending agent, and to produce a blend having improved working properties, such as, penetration into porous carbonaceous solids.

In another specific embodiment, the present invention relates to the employment in the production of carbon articles of pitch materials not generally considered suitable as binders for carbon articles by reason, for example, of their high melting points; the combination of such pitch materials with potentially reactive blending agents produces suitable binding materials having, for example, adequately reduced melting points, and which blends are sufficiently fluid under the usual conditions of mixing and forming carbon articles.

In general by proceeding according to the teachings of the present invention we are enabled to produce carbon articles, such as, electrodes for electro-thermal processes, which have substantially improved physical properties disproportionately higher than might be expected from a mere increase in the coking propensity of the new pitch-blending agent composite.

We have found, for example, that by increasing the coking propensity of a coal tar pitch when combined with a reactive blending agent by about 30% over that of the pitch alone we are able to more than double the strength of a baked carbon electrode employing such composite binding material. Furthermore, the apparent density of the carbon article may be increased as much or more than 10% and its electrical resistance may be decreased to the extent of 20-25% by the use of our blended composite binding materials.

Our invention is characterized by the dual nature of our pitch material-blending agent composites when employed as binding materials for divided carbonaceous solids. The blended composite is interactive chemically under temperature conditions more severe than generally employed in the operations of mixing and forming carbon bodies in the green state. Hence, such operations are generally facilitated rather than interfered with by taking advantage of desirable physical relationships existing between the components of the blended composite in its substantially unreacted initial state. After the green carbon body is formed, the components therein of our new binding material have a high degree of interactivity in the usual baking operations with the result that a substantially increased carbon residue from the binding material is obtained, and in some cases the coking propensity of the binding material may be further improved by a controlled heat treatment of the green carbon body below carbonization temperatures prior to the baking operation.

The binder compositions of our invention are composed of pitch material and a blending agent, of which the blending agent is essentially comprised of nitro compounds of aromatic hydrocarbons. These nitro aromatic compounds may also contain other active or functional substituent groups. The nature of the pitch materials and the blending agents will be more fully described hereinafter. The blending agent must be capable of altering the physical properties of the pitch materials to a desired degree and to induce a substantially increased carbon residue in carbon articles. By altering the physical properties is meant the lowering of the melting or softening point, or viscosity of the pitch materials to provide an adequate consistency to the resulting composition for mixing and forming carbon articles under reasonable working conditions.

Another effect of the blending agent may also consist in altering the phase relationships of a pitch material, e. g., decreasing the amount of a less soluble or dispersed phase therein as a means for controlling for example, the degree of penetration of the binder into variously sized porous carbon (coke, etc.) particles.

The amount of blending agent to be employed with a pitch material will depend upon several factors, such as, the nature of the pitch material, the working consistency required in the resulting binder composition, the reactivity of the blending agent and its ability to increase the coking propensity of the pitch material, the size and porous nature of the carbon particles to be mixed with the pitch material-blending agent composite, and the like. In general the amount of the blending agent used may be from at least 10% to about 45% of the weight of the pitch material, and the preferred proportions will be from about 15% to about 35%.

The amount of the new binding material comprising pitch material and blending agent required in the mixtures for making various carbon articles will be substantially the same as that when employing the usual pitches of general practice, i. e., approximately 25 to 40 parts by weight of binder per 100 parts by weight of the divided carbonaceous solids. The exact amount of binder to be employed in any given mixture is dependent upon the particle size distribution of the divided solids therein and to some extent upon the porous nature of the particles as well. For example, a mixture containing calcined petroleum coke flour (pulverized sizes below about 35 mesh) requires about 34 to about 40 parts binder per 100 parts of the flour. Again, a mixture of divided calcined coke containing 50% flour and 50% relatively larger particles consisting of sizes up to about 2 mesh requires from about 25 to about 30 parts by weight of binder per 100 parts of the coke. Other carbonaceous aggregates may require as low as about 20 to about 30 parts binder per 100 parts carbonaceous solids.

Our preferred procedure is to combine the pitch material with the blending agent first before adding in the divided carbonaceous solids, although we may also mix the pitch material, blending agent and the divided carbonaceous solids simultaneously.

The blending agent to be employed with pitch materials is comprised of one or more nitrated aromatic compounds, and the desired action of the nitro group may be enhanced by the presence of other substituent groups such as chloro, hydroxy, methoxy, amino, and the like.

Examples of nitrated aromatic compounds which we employ for blending agents with pitch materials are as follows:

Nitrobenzene
m-Dinitrobenzene
o-Nitrophenol
o-Nitroanisole
o-Nitroaniline
o-Nitrochlorobenzene
m-Nitrochlorobenzene
2,4 dinitrochlorobenzene
Mono- and dinitrotoluenes
Mono- and dinitroxylenes
o-Nitrodiphenyl
$\alpha$-Nitronaphthalene The nitro aromatic compounds which we have found particularly useful for our purposes are those which melt below about 100° C. and boil above about 200° C., and preferably below about 80° C., and about 225° C. respectively. These compounds are compatible with pitch materials to a high degree but will vary among themselves in solvent power for the various constituents of pitch materials. Differences in solvent power, however, are advantageous for controlling the physical properties of our composited binding material to suit various kinds of divided carbonaceous aggregates.

The nitro compounds need not be in a purified state, and the commercially produced more or less crude forms of the compounds employed therein have been found to be highly satisfactory for our purposes.

We have found it particularly useful, in many instances, for controlling the reactivity of the foregoing nitro compounds with pitch materials to employ a more or less reactive diluent comprising, such as, the organic chloro compounds, such as, p-chlorophenol, o-, m- and p-chloroaniline, monochlorodiphenyl, dichlorodiphenyl, $\alpha$-chloronaphthalene. The reactivity of the foregoing diluents with pitch materials is generally relatively low compared with that of the nitro compounds described. The use of such diluents with the nitro compounds is to retard early reaction of some of the latter with pitch materials, primarily during the mixing and forming of green carbon bodies. The diluent may also be employed as an additional means for controlling the physical properties of our new binding material comprising pitch materials and the nitro aromatic blending agents. The amount of the diluent which we employ may be from zero to about one part by weight per part of the nitro blending agent, and the amount of blending agent plus diluent will preferably not exceed about 35% by weight of the pitch material. The melting and boiling points of the diluent will be approximately the same as for the nitro aromatic compounds employed.

The pitch materials which we employ are of coal or petroleum origin, either by distillation or extraction processes, and may also be the by-product pitches from the destructive distillation of wood, other vegetable or organic materials, and the like. They may melt to free-flowing liquids at about 50° C. and higher or may only soften or become plastic up to about 225° C., but preferably such liquefaction or softening which is generally and collectively referred to in the claims as "softening point" should not be above about 200° C. The pitch may contain no benzol insoluble material or it may contain as much as 50–60% or so thereof. The pitch material may contain as much as 65% of constituents vacuum distillable therefrom at, say, 350° C. and 4 m. m. Hg pressure; or may contain no such constituents, e. g., the bottoms from such a vacuum distillation. Again, there are distillation cuts from pitches, particularly in the higher boiling range, for example, the overhead from 270° C. to 350° C. at 4–6 m. m. Hg pressure, which are suitable raw materials for our purposes. Still again, pitch fractions obtainable by solvent extraction or solvent fractionation of pitch materials may also be combined with potentially reactive blending agents for the purposes of our invention.

In the preparation of our blended binding materials, the temperatures at which the blending agent and pitch material are combined or blended should not exceed about 200° C., and preferably should be below about 175° C. in order to avoid premature reaction which may impair the working properties thereof for mixing and forming green carbon bodies.

Examples which illustrate the desirable effect of the foregoing nitro blending agents upon the properties of pitch materials, such as lowered melting point and increased coking propensity, are presented below. The combining of pitch material and blending agent on an experimental basis was made with the aid of a carrier-solvent, such as benzene or acetone, in which the blending agent was dissolved in approximately equal volume proportions. The solution of blending agent was mixed with the finely crushed pitch material at room temperature to form a slurry, and immediately thereafter the temperature was raised to 150–160° C. and held there about 30 minutes, whereupon the carrier-solvent was evaporated and a homogeneous composite of pitch material and blending agent was obtained. The use of a carrier-solvent, although a useful mechanical aid, is not essential however, and may be dispensed with. Other procedures which are useful in the preparation of our new binding materials will be described later. The reported melting points were determined by the cube-in-air, Barrett's method D-7. The coke residue of pitch materials and the composites thereof with blending agents were determined by either of two methods, (1) Barrett's B-8, and (2) our own method designated "long coke residue" which correlates more closely with the binder coke residues actually obtained in baked carbon articles. Our long coke residues were determined on samples placed in closed crucibles and baked in the manner usually employed for baking green carbon articles, e. g., 8 days to 1000° C., to carbonize or coke the sample.

*Example I.—Properties of pitch-nitro blending agent composite*

A. Hard pitch from coal tar, melting point 120° C. and coke residue (B-8) 43.4%, was blended as described above with 13% m-dinitrobenzene by weight of the pitch. The coking propensity of the blended composite was 26% greater than that of the pitch alone while the melting point was decreased approximately 15° C. Upon carbonization of the blended composite, a coke residue (B-8) amounting to 54.7% by weight thereof was obtained.

B. Fuel pitch, melting point 152° C. and long coke residue 68%, was blended as described above with 18% α-nitro-naphthalene by weight of the pitch to make a composite binding material having good working properties for mixing with carbonaceous solids composed predominantly of coke flour to form green carbon bodies. The melting point of the blended composite was substantially decreased from that of the pitch component to 102° C. and the coking propensity thereof in the green carbon body was increased as indicated by the long coke residue of approximately 70% which was obtained.

C. The acetone extraction residue of a medium coal tar pitch (melting point 88° C., benzol insoluble 23.4%, and long coke residue 63.8%) amounting to 55% of the pitch and having the properties, melting point 180° C., benzol insoluble 42.6%, was blended with 25% α-nitronaphthalene by weight of the pitch. The resulting blended composite binding material has good working consistency in addition to high coking propensity, the control of which properties is of considerable importance as a means for securing improved carbon articles. This composited binding material had a melting point of 82° C. and a long coke residue of approximately 73%.

D. The bottoms from the high end-point vacuum distillation of various pitches are in general not suitable as binders for the manufacture of carbon articles by the usual practices pertaining thereto because of their high melting points and sometimes an excessive amount of a less soluble or dispersed phase usually associated with such materials. We have found these distillation residues to be desirable raw materials when blended according to the practice of our invention. Binding materials were prepared from the pitch bottoms obtained by vacuum distilling a coal tar pitch (melting point 87° C., benzol insoluble material 23%, long coke residue 60%) to 296° C. endpoint at 5 m. m. Hg pressure. The pitch bottoms amounted to 65% of the original pitch and had the properties, melting point 180° C., benzol insoluble 38%. In addition to the potentially reactive blending agents reported in preceding sections of this example, others are given below which when combined with the pitch bottoms yield blended composite binding materials having easy working consistencies, superior binding power and high coking propensities in coke mixtures therewith to form green carbon articles.

| Sample No. | Blending Agent, Per Cent of Pitch Bottoms | Properties of Blended Binder | |
|---|---|---|---|
| | | Melting Point, °C | Long Coke Residue, Per Cent |
| D-1 | α-nitronaphthalene, 12.5<br>poly-Nitroxylene, 12.5 | 126 | 73.8 |
| D-2 | o-Nitrodiphenyl, 33.2 | 102 | 71.4 |

Other procedures of combining pitch materials with potentially reactive blending agents which do not employ a volatile carrier-solvent have been found more desirable in some cases, especially in the large scale production of the blended composite. For example, when we wish to employ a high melting pitch material, such as the vacuum distillation bottoms described in Example I-D, it is best not to heat this to so high a temperature as required for its liquefaction and then combine it with the blending agent because of the difficulty at high temperatures to control the properties of the resulting blended composite. Rather than use a volatile carrier-solvent, we may employ a melted starter batch consisting of a low melting pitch, such as a pitch melting below about 100° C., maintained at say, 150° C., and to which is then added small quantities of proportionate amounts of crushed high melting pitch material and blending agent, either of which may be cold or in a preheated condition. Then when the temperature equilibrium is re-established, additional amounts of the latter components are added until a suitable quantity of the blended composite in a substantially non-interacted state has been obtained. When the mixing apparatus is filled the blended composite is drained off, but a sufficient quantity is left in the apparatus to serve now as the starter for combining additional amounts of the high melting pitch material and blending agent; the original low melting pitch used thus becomes a minor and not objectionable constituent of the blended composite so prepared.

The blended composite binding materials and procedures relating thereto exemplified above and many others of like nature similarly producible are particularly adapted as already noted for bonding divided carbonaceous solids into dense, highly coherent masses for the production of improved amorphous and graphitic carbon articles.

Several examples, not intended for narrowing the scope of our invention, are presented below which show the marked improvements attainable in the quality of carbon articles produced in accordance with the practice of our invention embodying the production of carbon articles employing pitch materials combined with potentially reactive blending agents.

*Example II.—Production of carbon articles*

A. To 40 parts by weight of the composite binding material consisting of a pitch extraction residue and α-nitronaphthalene described in Example I–C, was added 100 parts by weight of pulverized calcined petroleum coke flour, all of which passed a 35 mesh sieve and about 25% of which passed a 325 mesh sieve. The coke and binding material were thoroughly mixed during 30 minutes at 150° C. in a dough-type mixer to a homogeneous finely granular "dry" consistency, then cooled and compressed at 90° C. and 2500 lbs./sq. in. to cylindrical shapes which were baked 8 days to 1000° C. to form amorphous carbon electrodes. The baked electrodes contained 73.9% by weight of the composite binding material as a carbonized residue, and have an apparent density of 1.65, an axial crushing strength of 11,900 lbs./sq. in. and an electrical resistivity of 0.0026 ohm/cu. in.

B. Another coke binding material mixture was made up similar to (A) above except that a reactive diluent, α-chloronaphthalene, replaced one tenth of the α-nitronaphthalene in the binder. This coke-binder mixture was easily mixed at 135° C. during 45 minutes, then cooled somewhat and compressed to a dense green carbon body at 100° C. and 2500 lbs./sq. in. After baking in the usual manner the resulting amorphous carbon body had an apparent density of 1.65, and axial crushing strength of 14,100 lbs./sq. in. and a resistivity of 0.0023 ohm cu. in.

C. A coal tar pitch, melting point 91° C., was extracted with a 1:4 mixture of butanone : hexane to obtain a residue amounting to 57% of the original pitch and having a melting point of about 175° C. The finely ground solvent-free residue was combined with 25% of its weight α-nitronaphthalene dissolved in an equal weight of benzene at room temperature and then heated to 160° C. with stirring during about 30 minutes. The carrier-solvent was thereby evaporated out of the mixture and a homogeneous blended binding material of good working consistency obtained. To 38 parts by weight of this binding material while still hot was added 100 parts by weight of calcined petroleum coke pulverized below 35 mesh particle size. The coke and binding material were thoroughly mixed for 20 minutes at about 160° C. in a dough-type mixer. The resulting finely granular mix was easily compressed at 110° C. and 2500 lbs./sq. in. into a compact completely fused mass, and could be formed into dense strongly coherent rods, tubes, plates or other shapes. Such formed green carbon bodies on baking 8 days to 1000° C. yielded amorphous carbon articles in which the carbon residue from the blended binding material amounted to 81% of the composited blend and which have a density of 1.70, an electrical resistivity of 0.0020 ohm/cu. in. and a crushing strength of at least 11,000 lbs./sq. in.

D. To 100 parts by weight of divided carbon solids consisting of 75% pulverized calcined petroleum coke flour and 25% of a carbon black was added 27 parts by weight of the binding material described in Example I–C. The carbon and binding material were easily and thoroughly mixed together during 30 minutes at 150° C. in a dough-type mixer. The mixture was cooled somewhat and compressed at 125° C. and 2500 lbs./sq. in. to form green carbon blocks. The resulting blocks were baked in the usual way to carbonize the binder; the carbonized binder residue amounted to 78% by weight of the blended binding material originally present. The baked carbon blocks had an apparent density of 1.80, and electrical resistivity of 0.0023 ohm/cu. in., and a crushing strength of more than 14,000 lbs./sq. in. Such amorphous carbon blocks could be heated above about 2000° C. in the usual graphitizing furnaces and thereby obtain graphitized carbon articles having the apparent density increased to approximately 1.85, electrical resistivity decreased about 10 fold and maintain approximately two-thirds of the high crushing strength of the amorphous state. Such conditions of high density and strength of graphitized articles are not readily attained in the usual practices for producing graphitized carbon articles. Similarly, superior graphitized articles may also be obtained from the amorphous carbon articles described in the other examples herewith.

Our pitch material-blending agent composite may be advantageously employed for cementing together the sections of fabricated carbon structures and consists in applying a layer of the blended composite in a heated pasty or fluid condition to the surfaces to be cemented, pressing the sections together and heat treating the built structures to carbonize the cement. Our blended composites are well suited for use as cements because of their high coking propensities, a condition which permits a low porosity, high strength carbonized bond to be produced between amorphous or graphitized carbon sections. Rather than use the pitch material-blending agent composite directly as a cement, it is preferred, for reasons of attaining the maximum strength and lowest porosity in the carbonized bond, to incorporate into such blends some proportion of a finely divided carbon filler, such as powdered calcined or graphitized coke, or a carbon black or combinations of these in amount not to exceed about 50% by weight of the pitch material plus blending agent. The kind and amount of carbon used as filler in the cement is dependent to some extent upon the amorphous or graphitic carbon components in the sections to be bonded together. Generally, however, the nature and relative proportions of the components making up the carbonaceous filler are approximately the same as that of the pulverized or fine carbonaceous solids used in producing the carbon sections. The preferred amount of such filler will be from about 15% to about 40% by weight of the pitch material-blending agent composite. The cements so prepared for bonding the sections of a carbon structure should have a good working consistency when moderately heated, say, not to exceed about 125° C.; this condition may be satisfactorily met in most cases by adjusting the amount of a blending agent for any given pitch material, and in some cases also by using the lower proportions of carbon filler therein. Examples relating to cement compositions and cementing of sectional carbon structures follow herewith.

*Example III.—Cementing compositions and bonding carbon structures.*

A. To 80 parts by weight of a crushed fuel pitch melting at 150° C. there is added 20 parts by weight of o-nitrodiphenyl and 25 parts by weight of powdered calcined coke. This mixture is thoroughly mulled at 160° C. for about 30 minutes. The resulting b'ended mixture may be used immediately for cementing carbon sections together or cooled and stored for later use. It is easily brought to a working paste condition by heating to about 125° C. and is well adapted for cementing together carbon sections prepared, for instance, as in Example II-C and which on baking will leave a cementing bond of carbon residue amounting to approximately 72% or more of the cement composition.

B. To 70 parts by weight of the crushed pitch material described in Example I-D (vacuum distillation bottoms) is added 25 parts of a potentially reactive blending agent, o-nitrodiphenyl, and 5 parts of a reactive diluent, α-chloronaphthalene. The mixture is started with a small amount of medium pitch as previously described, heated to 150° C. and to which is added the pitch bottoms and blending agent plus diluent and stirred until dissolution of the pitch bottoms is complete. A high carbon residue cement is prepared from the foregoing prepared blended composite by mulling into it at about 125° C. 35 parts by weight of powdered graphitized petroleum coke flour. This cement composition is easily workable at about 100° C. and is well adapted for cementing graphitized carbon sections prepared from petroleum coke and our blended binding materials and which are to be used, for example, for such purposes as carbon linings in electro-thermal cells, and the like. The cemented linings upon carbonization contain a carbon residue from the cement amounting to approximately 78–80% of the cement composition. The carbon bond so produced is substantially no more pervious to the cell reactants than the carbon sections thereof.

We claim as our invention:

1. A potentially reactive binder composition of high coking propensity consisting essentially of pitch melting above about 50° C. and below about 225° C., and blending material containing α-nitronaphthalene.

2. A potentially reactive binder composition of high coking propensity consisting essentially of pitch melting above about 50° C. and below about 225° C., and blending material containing o-nitrotoluene.

3. A potentially reactive binder composition of high coking propensity consisting essentially of pitch melting above about 50° C. and below about 225° C., and blending material containing o-nitrodiphenyl.

4. A binder composition comprising essentially at least 55% of pitch melting above 50° C. and below about 225° C. blended with a compatible nitro aromatic compound reactive therewith at elevated temperatures, in proportions of at least 10% and not more than 45% of said nitro compound.

5. A binder composition comprising essentially pitch melting above about 50° C. and below about 225° C. and a blending material comprising essentially a compatible nitro aromatic compound reactive therewith at temperatures above about 200° C.

6. A binder composition comprising essentially pitch having a melting point of 50° C. to about 225° C. and from about 10% to about 45% of blending agent by weight of the pitch, said blending agent being in physically modifying and melting point lowering relationship with the pitch and consisting essentially of a substituted aromatic hydrocarbon, wherein the sole polar substituent is a nitro group.

7. A binder composition comprising essentially pitch of 50° C. to about 225° C. melting point and from about 10% to about 45% of compatible blending material by weight of the pitch, said blending material melting below about 100° C. and boiling above about 200° C. and being in physically modifying and melting point lowering relationship with the pitch and consisting essentially of nitro aromatic material reactive with the pitch at temperatures above about 175° C.

8. A binder composition comprising essentially pitch of 50° C. to about 225° C. melting point and from about 10% to about 45% of compatible blending material by weight of the pitch, said blending material melting below about 100° C. and boiling above about 200° C. and being in physically modifying and melting point lowering relationship with the pitch and consisting essentially of a nitro aromatic material reactive with the pitch at temperatures above about 175° C., together with a chlorinated aromatic compound in proportion of 0–1 part per part of nitro material.

9. A heat hardenable cement of high coking propensity comprising essentially finely divided carbonaceous material and a carbonizable binder therefor, said binder comprising essentially at least 55% pitch of 50° C. to about 200° C. melting point and from about 15% to about 35% by weight of the pitch of compatible blending material melting below about 80° C. and boiling above about 225° C. in physically modifying relationship with the pitch, said blending material consisting essentially of a nitro aromatic material reactive with the pitch at temperatures above about 175° C., the divided carbon material being in the proportion of from about 15% to about 40% by weight of the pitch-blending material composite.

10. A pitch composite melting above 50° C. consisting essentially of at least 55% pitch melting at about 50° to about 225° C. together with not less than 10% nor more than 45% of a nitro substituted aromatic compound.

11. A pitch composite melting above 50° C. and convertible by heat to more than 50% of solid infusible carbonaceous residue, comprising 55-90% of pitch melting at about 50° to about 225° C. together with 10-45% of a nitro substituted aromatic compound, the proportions of said compound being such as to increase the coking propensities of the composite.

12. A pitch binder composite melting above 50° C. and below about 225° C. and convertible by heat to more than 50% coke, comprising essentially a major part of pitch melting at about 50° C. to about 225° C. and not less than 10% and not more than about 45% of a nitro substituted aromatic hydrocarbon.

13. A composite pitch binder melting above 50° C. and below 225° C., consisting essentially of a major portion of pitch melting at about 50° C. to about 225° C. and not less than about 10% and not more than about 45% of a ring substituted aromatic compound having a nitro group and a chlorine group as the substituent groups.

FREDERICK L. SHEA, Jr.
LESLIE H. JUEL.

REFERENCES CITED

The following references are of record in the file of this patent:

UNITED STATES PATENTS

| Number | Name | Date |
| --- | --- | --- |
| 1,340,855 | Weiss | May 18, 1920 |
| 2,270,181 | Cole et al. | Jan. 13, 1942 |
| 2,270,199 | Thrune | Jan. 13, 1942 |